United States Patent [19]

Mori

[11] Patent Number: 4,849,866
[45] Date of Patent: Jul. 18, 1989

[54] RAINBOW CREATING DEVICE

[76] Inventor: Kei Mori, 3-16-3-501, Kaminoge, Setagaya-ku, Tokyo, Japan

[21] Appl. No.: 256,188

[22] Filed: Oct. 7, 1988

Related U.S. Application Data

[63] Continuation of Ser. No. 58,092, Jun. 4, 1987, abandoned.

[30] Foreign Application Priority Data

Jun. 10, 1986 [JP] Japan .................. 61-134305
Apr. 13, 1987 [JP] Japan .................. 62-90089

[51] Int. Cl.[4] ........................................ F21V 5/00
[52] U.S. Cl. ............................ 362/327; 362/326; 362/811; 350/168
[58] Field of Search .......... 362/326, 331, 337, 805, 362/806, 811, 327, 339; 350/162-18, 170, 321, 286, 168; 356/126, 136, 137, 256

[56] References Cited

U.S. PATENT DOCUMENTS

| | | | |
|---|---|---|---|
| Re. 26,617 | 6/1969 | Stanfor | 350/168 |
| 367,402 | 8/1987 | Irwin | 362/811 |
| 1,043,004 | 10/1912 | Hoffman | 350/168 |
| 1,083,326 | 1/1914 | Hoffman | 350/118 |
| 2,443,258 | 6/1948 | Lindonblad | 350/168 |
| 3,306,974 | 2/1967 | Cunnally | 350/286 |
| 3,449,037 | 6/1969 | Koostor | 350/168 |
| 3,510,195 | 5/1970 | Noble | 350/286 |
| 3,608,999 | 9/1971 | Bailey | 362/326 |
| 3,904,866 | 9/1975 | Hayes | 362/811 |
| 4,150,880 | 4/1919 | Howe et al. | 350/168 |
| 4,214,297 | 7/1980 | Kühn et al. | 362/327 |

*Primary Examiner*—Raymond A. Neill
*Attorney, Agent, or Firm*—Jordan and Hamburg

[57] ABSTRACT

A rainbow creating device comprises optical conductors through which light rays consisting of visible light ray components are transmitted. A lens is placed opposite the respective light-emitting ends of the optical conductors for converting the light rays emitted from them to parallel light rays. Prisms are placed for receiving the parallel light rays from the lens and for effecting the spectroscopic separation of the parallel light rays.

7 Claims, 2 Drawing Sheets

RAINBOW CREATING DEVICE

This application is a continuation of application Ser. No. 058,092, filed June 4, 1987, now abandoned.

BACKGROUND OF THE INVENTION

The present invention relates to a rainbow creating device, in particular, a device for creating an artificial rainbow for decorative purposes on an optical desired position such as a place where a fountain or trees exist inside or outside of buildings or in other areas.

With respect to recent building designs, a restful place is created inside of a building by installing a fountain with trees planted around it. In particular, such an area is laid out in the lobby or in the garden of a hotel, or the like, with the intention of improving the atmosphere. However, all of these restful places tend to be similar to each other and there is an absence of novelty to attract a person's attention.

SUMMARY OF THE INVENTION

The primary object of the present invention is to produce an artificially created rainbow in order to enhance the atmosphere of a lobby in a hotel or a building and thereby provide a more pleasant, restful place for the occupants and visitors.

Another object of the present invention is to create an arched rainbow similar to an actual rainbow.

The above-mentioned features and other advantages of the present invention will be apparent from the following detailed description along with the accompanying drawings.

DESCRIPTION OF THE PREFERRED EMBODIMENTS

Figure 1:
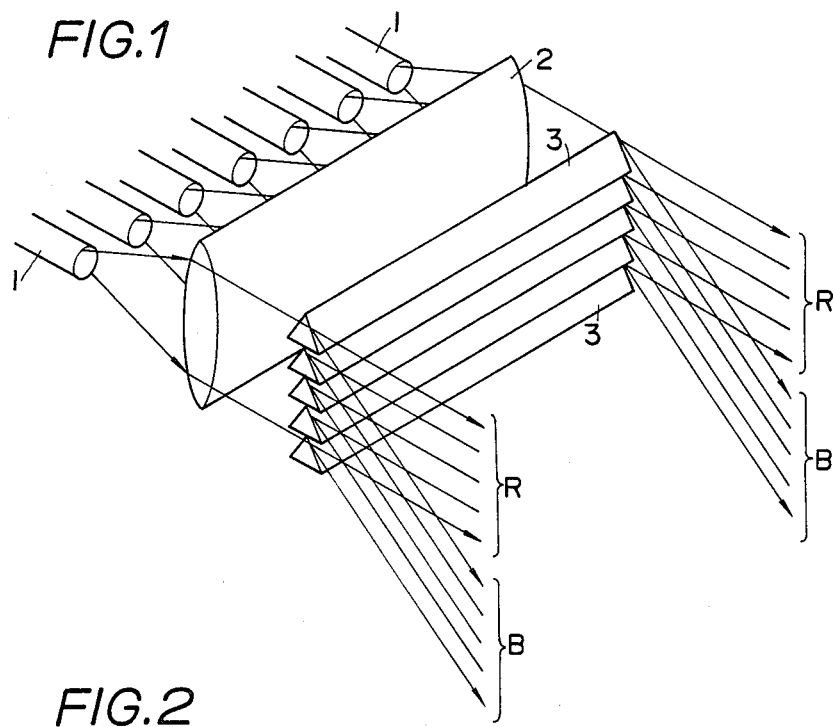
FIGS. 1 and 2 are perspective views for explaining embodiments of a rainbow creating device according to the present invention, respectively.

FIG. 1 is a perpsective construction view for explaining an embodiment of a rainbow creating device according to the present invention. In FIG. 1, 1 is an optical conductor through which light rays consisting of visible light ray components are transmitted, 2 a lense placed opposite the light-emitting end of the optical conductor 1 for converting the light rays emitted to parallel light rays, and 3 an elongated prism for receiving the parallel light rays from the lense 2 and for effecting the spectroscopic separation of the parallel light rays.

In the embodiment shown in FIG. 1, a large number of optical conductors 1 are arranged in a line, an elongated linear lense 2 is placed to said opposite conductors 1 and elongated prisms 3 are arranged so as to be opposite the elongated linear lense 2.

The prism 3 may be a single prism or may comprise a large number of prisms 3 superimposed on one another and formed as a single unit. The parallel light rays from the linear lense 2 are spectroscopically divided into several light ray components (a spectrum) by means of the prisms 3 arranged as mentioned above. The upper-side light rays are rays consisting of red (R) component light rays of a long wave length, and the lower-side light rays are rays consisting of blue (B) component light rays of a short wave length. The intermediate light rays are refracted correspondingly to respective wave lengths. In such a way, a rainbow is formed. The red component light rays occupy the upper area, and the blue component light rays occupy the lower area. The rainbow looks like a large number of rainbows superimposed on one another according to the distance from the prism 3. As a result, the rainbow is more interesting and pleasant to look at.

The rainbow, formed as mentioned above, is radiated onto optically desireable objects such as trees, fountains or the like, and it makes a pleasant viewing spectacle in combination with such objects.

Figure 2:
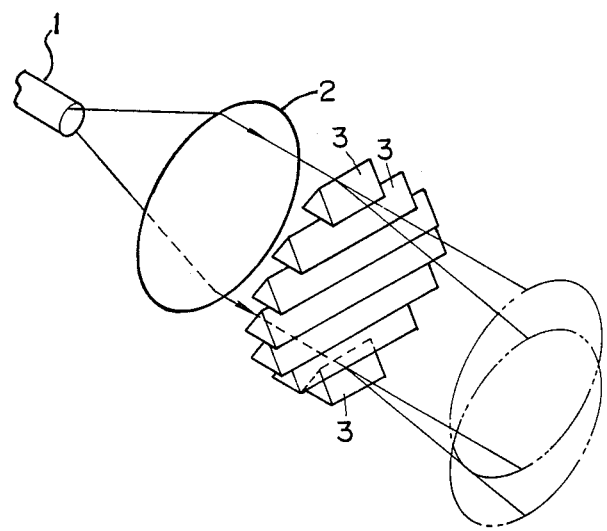

FIG. 2 is a perspective construction view showing another embodiment of the present invention. In FIG. 2, the same reference numeral as that of FIG. 1 is used with the parts performing the same action as that of FIG. 1. And further, in this embodiment, a single optical conductor cable 1 is employed as the light source, a single lens 2 and an almost circuit prism 3 are employed with the optical conductor cable 1. Concerning the prism 3, it is possible that a combination of prisms 3 be super-imposed on one another in multi-stage fashion and formed circularly in its entirety as shown in FIG. 2, or alternatively, a single circular prism can be employed. Consequently, according to this embodiment of the present invention, it is very easy to construct a device consisting of an optical conductor cable 1, a lens 2, a prism 3, and so on. Furthermore, the rainbow created is almost circular making it unusual and interesting.

As is apparent from the foregoing description, according to the present invention, a rainbow can be created artificially by using a simple construction. And further, an interesting spectacle can be created in combination with trees, a fountain or other attractive things that are employed conventionally in the design of open spaces.

However, since the afore-mentioned rainbow creating device converts the light rays emitted from the optical conductor to parallel light rays by use of a lens, the rainbow created thereby corresponds to the light rays emitted from the respective optical conductor, and therefore it is possible to create an arched rainbow similar to an actual rainbow.

Figure 3:
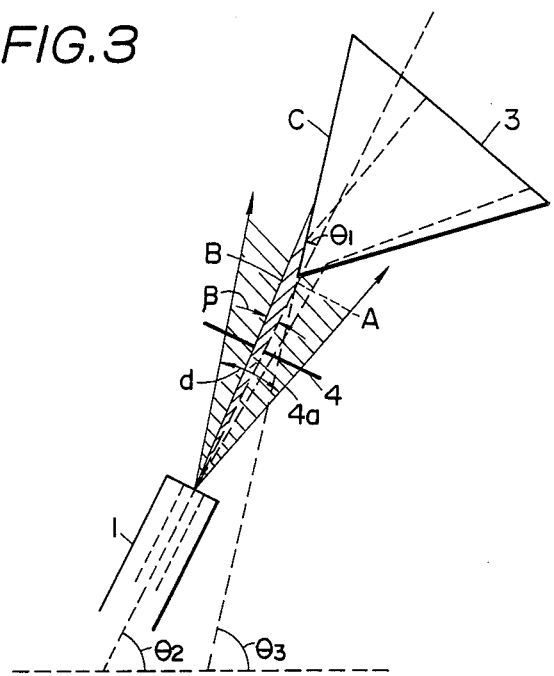
FIGS. 3 and 4 are construction views for explaining embodiments of an arched rainbow creating device according to the present invention, respectively.

FIG. 3 is a construction view for explaining an embodiment of an arched rainbow creating device according to the present invention. In FIG. 3, 1 is an optical conductor, 3 a prism, and 4 a slit plate. As shown in FIG. 3, the prism 3 is so constructed that it has a cross-section of an almost regular triangle. The light rays emitted from the optical conductor 1 are radiated toward a vertical angle portion A of the prism 3 through a slit 4a formed in the slit plate 4, and further, the central portion B of the light rays impinges on the one-sided surface C of the prism 3 through the slit 4a of the slit plate 4.

As is will known, the radiation angle $\alpha$ of the light rays emitted from the optical conductor 1 is ordinarily in the range of 40° to 50°. However, the light rays at the central portion within the radiation angle $\beta$ of approximately of 4° to 5° are employed as the effective light rays. In such a manner, in order to utilize the light rays at the central portion, the radiation angle of the light rays is narrowed by cutting off the circumferential (external-side) portion of the light rays. If light rays of high intensity are emitted through the slit within the narrow radiation angle as mentioned above, a bright rainbow can be created. And further, since the light rays emitted from the optical conductor are not converted to parallel light rays by use of a lens or the like, an arched rainbow can be created in accordance with the shape of the optical conductor 1 and that of the slit.

Furthermore, the position of the rainbow emission changes in accordance with an angle $\theta_1$ (10° to 20°). In order to obtain the angle $\theta_1$, for example, if the optical conductor 1 is inclined by $\theta_2$ in relation to the standard line H and the surface C of the prism 3 is inclined by $\theta_3$, the angle $\theta_1$ can be obtained as follows.

$$\theta_1 = \theta_3 - \theta_2$$

In practice, $\theta_3$ is equal to 78° and $\theta_2$ is equal to 65°. So, $\theta_1$ turns out to be 13°.

Figure 4:
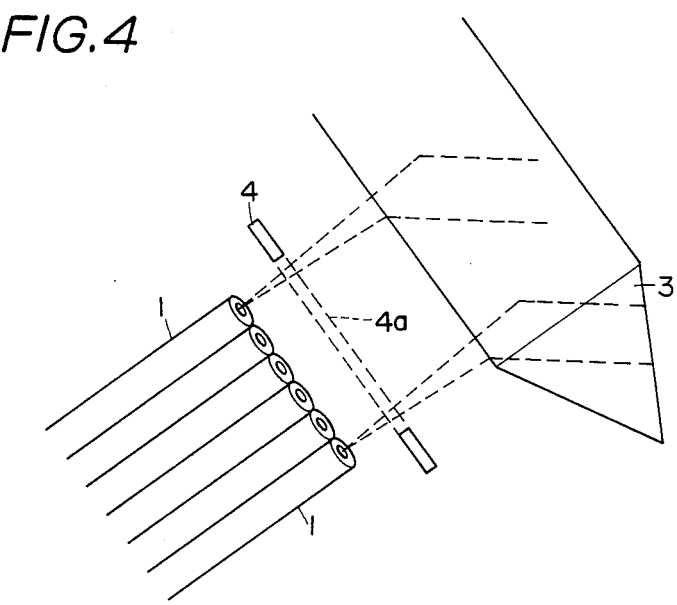

FIG. 4 is a construction view showing another embodiment of present invention. In this embodiment, the prism 3 is formed elongatedly, and further a large number of optical conductors 1 are arranged in a line along the length of the prism 3. In such a manner, the brightness of the rainbow created can be increased.

As is apparent from the foregoing description, according to the present invention, an arched rainbow, similar to an actual rainbow, can be artificially and effectively created with a simple construction.

I claim:

1. A rainbow creating device comprising optical conducting means for conducting visible white rays, said optical conductor means having a light-emitting end, a lense means disposed opposite to said light-emitting end for converting light rays emitted from said light-emitting end to parallel light rays and prism means receiving said parallel light rays from said lens means and effecting spectroscopic separation of said parallel light rays to produce an artificial rainbow.

2. A rainbow creating device comprising optical conducting means for conducting visible light rays, said optical conductor means having a light-emitting end, a lens means disposed opposite to said light-emitting end for converting light rays emitted from said light-emitting end to parallel light rays, and prism means receiving said parallel light rays from said lens means and effecting spectroscopic separation of said parallel light rays to produce an artificial rainbow, said optical conductor means comprising a plurality of optical conductor elements disposed such that the light-emitting ends of said optical conductor elements are juxtaposed to one another in linear array, said prism means comprising a plurality of longitudinal extending prism elements disposed parallel to one another, each of said prism elements having substantially the same longitudinal length and extending generally parallel to said linear array of said light-emitting ends, whereby a plurality of superimposed rainbows are produced.

3. A rainbow creating device comprising a single optical conductor for conducting visible light rays, said optical conductor having a light-emitting end, a lense means disposed opposite to said light-emitting end for converting light rays emitted from said light-emitting end to parallel light rays, and prism means receiving said parallel light rays from said lens means and effecting spectroscopic separation of said parallel light rays to produce an artificial rainbow, said prism means comprising a plurality of longitudinally extending prism elements disposed parallel to one another, said prism elements having longitudinal ends, some of said plurality of prism elements having a progressively increasing longitudinal length and other of said plurality of prism elements having a progressively decreasing longitudinal length such that said longitudinal ends of said plurality of prism elements are disposed on a circle, whereby a substantially circular rainbow is produced.

4. A rainbow creating device comprising optical conductor means for conducting visible light rays, said optical conductor means having a longitudinal axis and a light-emitting end, a prism means disposed opposite to said light-emitting end, a slit-plate means disposed between said light-emitting end and said prism means, said slit-plate means defining a slit opening through which said light rays pass upon being emitted from said light-emitting end and transmitted to said prism means, said light-emitting end radiating light rays therefrom at a radiation angle of from about 40 to 50 degrees, said slit opening cutting off the outer circumferential portion of said light rays emitted from said light-emitting end to thereby pass a remaining central portion having a radiation angle of about 4 to 5 degrees, said prism means having a substantially triangular cross-secional configuration with three sides, said prism means being disposed such that said central portion of said light rays passing through said slit opening impinge on one of said three sides of said prism means to thereby produce an artificial rainbow, said prism means being disposed relative to said optical conductor means such that the angle between said longitudinal axis and said one side of said prism is within the range between 10 and 20 degrees.

5. A rainbow creating device according to claim 4 wherein said optical conductor means has a longitudinal axis disposed at a first angle relative to a fixed reference line, said one side of said prism being disposed a second angle relative to said fixed reference line, said second angle being greater than said first angle.

6. A rainbow creating device according to claim 4 wherein said optical conductor means comprises a plurality of optical conductor elements juxtaposed to one another in linear array, said prism means comprising an elongate prism in which the elongate extent of said prism is generally parallel to the linearly arrayed optical conductor elements.

7. A rainbow creating device according to claim 4 wherein said artificial rainbow has a generally arch-shaped configuration.

* * * * *